A. A. SMITH.
COMBINATION PACKING.
APPLICATION FILED MAR. 24, 1916.
1,360,593.
Patented Nov. 30, 1920.
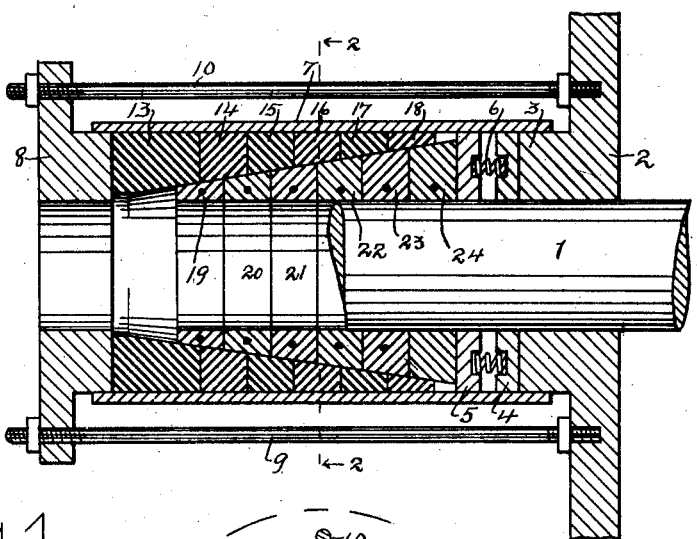
Fig 1
Fig 2
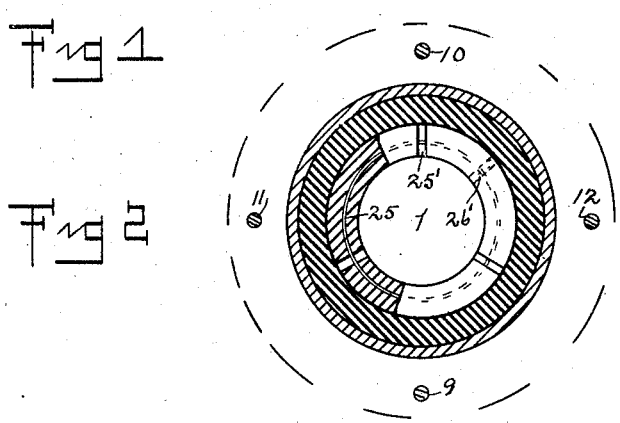
INVENTOR
Allen Andrew Smith
BY
Arthur Phelps Marr
ATTORNEY

UNITED STATES PATENT OFFICE.

ALLEN ANDREW SMITH, OF GREAT NOTCH, NEW JERSEY.

COMBINATION-PACKING.

1,360,593.  Specification of Letters Patent.  Patented Nov. 30, 1920.

Application filed March 24, 1916. Serial No. 86,329.

*To all whom it may concern:*

Be it known that I, ALLEN ANDREW SMITH, a citizen of the United States, and a resident of Great Notch, county of Passaic, State of New Jersey, have invented certain new and useful Improvements in Combination-Packings, of which the following is a specification.

This packing is intended principally for use in high pressure work, that is where super-heated or high pressure steam or ammonia or other vapors or gases are to be confined within the compression cylinder or engine with which the packing is used.

It has been found that what is commonly termed "soft packing" does not operate satisfactorily in high pressure work or with fugitive gases or vapors for the reason that it is not possible to provide a sufficiently tight joint or close impingement of a soft packing upon the piston rod and therefore leaks will occur.

In addition to this, when soft packing wears and becomes weakened it is apt to blow out when subjected to high pressure.

I have provided a packing which is a combination of a metallic and soft packing, the metallic packing receiving the direct pressure and producing the joint and wearing surfaces for the rod and the soft packing producing the resiliency necessary in all highly efficient packings.

A combination soft and metallic packing will be described as the specification progresses and its operation and advantages will be fully set forth.

The following is what I consider a good means of carrying out my invention and the accompanying drawings are to be considered in pursuing the specification.

In the drawings—

Figure 1 is a longitudinal section.

Fig. 2 is a sectional view on the line 2—2 in Fig. 1.

Similar reference numerals indicate like parts in all of the figures where they appear.

At 1, in each of the figures, I have indicated a piston rod or other movable member which enters a cylinder, and at 2, the end of a cylinder is indicated, through which the rod 1, passes. The cylinder end 2, is provided with a projection 3, which is to receive the stuffing box or gland.

Upon the rod 1, and adjacent to the projection 3, I arrange a plurality of metallic disks 4 and 5, and between these disks and received in recesses therein, are springs 6, which urge the disks 4 and 5 away from each other.

I arrange a metallic thimble or cylindrical member 7, upon the projection 3, and this member 7, projects outward to a desirable extent receiving in its opened end a movable compression ring 8. Between the ring 8, and the cylinder end 2, I provide a plurality of screw-threaded rods 9, 10, 11, and 12, by means of which the compression ring 8 is moved toward or away from the cylinder end 2.

The soft or fibrous portion of my packing consists of a plurality of rings produced from any suitable soft packing. The cross-section of these rings may be varied at will provided that they are so arranged and positioned to accomplish certain purposes that will be later described.

In Fig. 1, I have shown a plurality of soft packing rings at 13, 14, 15, 16, 17, and 18, and it will be noted that although the external diameter of each of these rings is in each instance the same, the internal diameter and cross-sectional area varies as each ring has the internal surface cut on a taper and the taper is uniform throughout the entire series of rings.

The metallic packing members are shown interior to the soft packing members and are indicated at 19, 20, 21, 22, 23 and 24, and it will be noted that although the interior diameter of each of these rings is the same the external surface is turned on a taper and that the entire series produces a sectional metallic sleeve having an outer uniform taper, a taper which coincides with the internal taper of the soft packing rings.

The metallic rings bear upon the rod 1, and are urged into constant close impingement and fair bearing with the rod 1, by the movement or compression of the soft packing members.

Each metallic ring is split into a plurality of parts as shown in Fig. 2, where three parts are set forth.

In producing the metallic packing rings I will probably cast them independently of each other and I prefer that a thin copper wire 25, should be cast in each metallic ring. This wire will serve to retain the sections of a ring in position, while the packing is being assembled upon the rod or within the stuffing box, but it will be understood that the wire 25, is a very fine wire and that during the molding or casting process this wire will be efficiently annealed so that it will offer little or no resistance to the independent movement of each section of the ring when compression of the soft packing urges the rings inward or toward each other to cause them to firmly impinge upon the rod 1.

It will of course be understood that the internal diameter of each of the metallic rings should be equal to the diameter of the rod 1, with which they are to operate.

One of the important functions and greatest advantages of my invention resides in the fact that the packing that I produce may be termed "floating packing" that is, it will readily adjust itself to the position of the rod 1, therefore should my packing be used in conjunction with a rod that is slightly bent or one that does not travel on a true axial line, the packing will adjust itself to the changing position due to the movements of the rod and will prevent the breaking or checking so apt to occur in metallic packings.

It will be noted that the wedge-shaped or tapered construction of this invention is such that it is particularly adapted for use in connection with fluid compressors or the like, as the drag of the harder packing on the piston rod during the in-stroke will tend to disengage the inclined faces of the packings so that the segments of the inner packing will be free to move radially to a slight degree so that the opening through the segments will expand and permit the freedom of movement of the rod. Obviously, when used in this connection, there is little or no pressure in the cylinder, so that the packing may loosen slightly without affecting the efficiency of the compressor. On the outstroke of the piston, however, it will be obvious that the pressure is created in the cylinder, and the drag of the inner packing and the piston rod coupled with the power of the springs, will drive the inner packing into the tapered bore of the outer packing and cause the segments to bear against the rod, thereby preventing the escape of the compressed fluid.

It will be noted that although the metallic packing members are formed as a plurality of rings and the fibrous packing members are also formed as a plurality of rings, the junctions between the metallic rings and soft packing rings are out of alinement with each other, that is the junction between metallic rings is at about mid-width an adjacent section of soft packing. This idea should be carried out throughout the assembly of the packing.

It will also be observed that as the metallic packing rings are split, the split line in a metallic ring should be arranged at an angle to the split line of any adjacent ring. The split line of the ring shown in Fig. 3, is indicated at 25', the split line of the next adjacent ring is indicated by the dotted lines 26'. As the rings bear one upon the other steam or gas cannot escape through the splits in the several rings.

It will of course be understood that my packing may be adapted to any diameter or length of stuffing box and that no change will be required in the construction of the gland or box and it will be further understood that parts may be used without the whole and that modifications may be made within the scope of the appended claims without departing from the principle or sacrificing the advantages of the invention.

Having carefully and fully described my invention, what I claim and desire to secure by Letters Patent is:

1. The combination with an apertured head, a piston rod slidable through the aperture in the head and a packing gland surrounding the aperture, of a relatively soft packing element having a tapered bore extending longitudinally therethrough, a relatively hard frusto conical packing element on the piston rod, said relatively hard packing element being adapted to fit the tapered bore, and being divided radially into a plurality of independent segments and resilient means disposed at the larger end of the harder packing element to force the same into the tapered bore of the softer packing element whereby the drag of the piston rod on the harder packing element when said rod is traveling in one direction will tend to free said rod and compensate for any inaccuracies therein and when traveling in the opposite direction to cause the harder packing element to more firmly contact with the softer packing element.

2. A packing element comprising a plurality of rings arranged in abutting relation, each ring being formed of a plurality of radially separable segments and wires wholly embedded in the segments to hold the same in circular formation during the assembly and adapted to be readily distorted after assembly to permit the segments to move independently in a radial direction.

Signed New York city March 6, 1916.

ALLEN ANDREW SMITH.